(12) United States Patent
Qin et al.

(10) Patent No.: US 10,017,593 B2
(45) Date of Patent: *Jul. 10, 2018

(54) FUNCTIONALIZED POLYMER

(71) Applicant: Bridgestone Corporation, Tokyo (JP)

(72) Inventors: Zengquan Qin, Copley, OH (US);
Terrence E. Hogan, Uniontown, OH (US); Toshihiro Uchiyama, Tokyo (JP); Joshua P. Abell, Akron, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,482

(22) Filed: Jan. 31, 2017

(65) Prior Publication Data
US 2017/0267798 A1 Sep. 21, 2017

Related U.S. Application Data

(63) Continuation of application No. 14/369,422, filed as application No. PCT/US2012/070898 on Dec. 20, 2012, now Pat. No. 9,556,297.

(60) Provisional application No. 61/582,277, filed on Dec. 31, 2011.

(51) Int. Cl.
| | | |
|---|---|---|
| *C08G 63/00* | (2006.01) | |
| *C08G 69/00* | (2006.01) | |
| *C08F 212/08* | (2006.01) | |
| *C08L 15/00* | (2006.01) | |
| *C08C 19/44* | (2006.01) | |

(52) U.S. Cl.
CPC .......... *C08F 212/08* (2013.01); *C08C 19/44* (2013.01); *C08L 15/00* (2013.01)

(58) Field of Classification Search
CPC .......... C08L 15/00; C08L 9/00; C08F 212/08; C08C 19/44; C08K 3/36
USPC ............ 528/281, 275, 274, 272, 271; 520/1
See application file for complete search history.

(56) References Cited

U.S. PATENT DOCUMENTS

| | | | |
|---|---|---|---|
| 9,556,297 B2 * | 1/2017 | Qin ........................ | C08L 15/00 |
| 2005/0245696 A1 * | 11/2005 | Cole ....................... | B01F 5/061 526/72 |
| 2010/0160542 A1 * | 6/2010 | Poulton ................... | C08C 19/44 524/588 |

OTHER PUBLICATIONS

Lukasik et al, Copolymerization of Diethylaluminum Acrylate and Styrene, 1983, Journal of Polymer Science: Polymer Letters Edition, vol. 21, 17-21.*

* cited by examiner

*Primary Examiner* — Jessica Whiteley
(74) *Attorney, Agent, or Firm* — Meredith E. Hooker; David G. Burleson

(57) ABSTRACT

A method for providing a polymer having terminal functionality involves reacting a terminally active polymer with an α,β-ethylenically unsaturated compound that includes a group 2-13 element so as to provide a functionalized polymer. The resulting polymer exhibits enhanced interactivity with particulate fillers and can be used in the manufacture of vulcanizates.

10 Claims, No Drawings

FUNCTIONALIZED POLYMER

CROSS-REFERENCE TO RELATED APPLICATIONS

This is a continuation of U.S. patent application Ser. No. 14/369,422 which entered U.S. national stage on 27 Jun. 2014 and issued as U.S. Pat. No. 9,556,297 on 31 Jan. 2017, which is a national stage entry application of international application no. PCT/US2012/070898, filed 20 Dec. 2012 and which claims the benefit of U.S. provisional patent application no. 61/582,277, filed 31 Dec. 2011.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in rolling resistance, which correlates with a reduction in hysteresis and heat build-up during operation of the tire. (A reduction in hysteresis commonly is determined by a decrease in tan δ value at an elevated temperature, e.g., 50° or 60° C. Conversely, good wet traction performance commonly is associated with an increase in tan δ value at a low temperature, e.g., 0° C.) Reduced hysteresis and traction are, to a great extent, competing considerations: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s), which commonly results in reductions in hysteresis (see above). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a method for providing a polymer having terminal functionality which includes a group 2-13 element. One or more terminally active polymers are reacted with an α,β-ethylenically unsaturated compound that includes a group 2-13 element so as to provide a functionalized polymer. The α,β-ethylenically unsaturated compound can be represented by the general formula

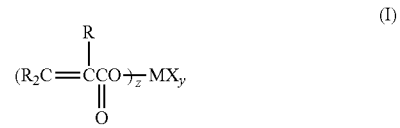

where each R independently is a hydrogen atom or $C_1$-$C_{10}$ alkyl group, M is a group 2-13 element, y and z are integers with the provisos that z is not zero and y+z is equal to a valence of M, and each X independently is $OR^1$, $OC(O)R^1$, $C(O)OR^1$ or $NR^1_2$ in which each $R^1$ independently is a $C_1$-$C_{30}$ alkyl group.

In another aspect is provided a polymer with terminal functionality that includes a group 2-13 element as part of the radical of an α,β-ethylenically unsaturated compound. The functionalized polymer can be represented by the general formula

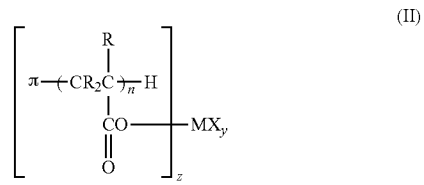

where R, M, y, z and X are defined as above, π is a polymer chain that includes unsaturated mer, and n is an integer of from 1 to 10 inclusive. Where z>1, the functionalized polymer can be considered to be coupled.

In the foregoing aspects, the polymer chains preferably include polyene mer units. In certain embodiments, the polyene(s) can be conjugated diene(s). Where other types of mer are present, the conjugated diene mer can incorporate substantially randomly along the polymer chain. The polymer that includes polyene mer can be substantially linear.

The functionalized polymer can interact with various types of particulate filler including, for example, carbon black and silica. Compositions, including vulcanizates, that include particulate fillers and such polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"(meth)acrylate" means methacrylate or acrylate;

"phr" means parts by weight (pbw) per 100 pbw rubber;

"radical" means the portion of a molecule that remains after reacting with another molecule, regardless of whether any atoms are gained or lost as a result of the reaction;

"non-coordinating anion" means a sterically bulky anion that does not form coordinate bonds with, for example, the active center of a catalyst system due to steric hindrance;

"non-coordinating anion precursor" means a compound that is able to form a non-coordinating anion under reaction conditions;

"ring system" means a single ring or two or more fused rings or rings linked by a single bond, with the proviso that each ring includes unsaturation;

"terminus" means an end of a polymeric chain;

"terminally active" means a polymer with a living or otherwise very reactive (e.g., pseudo-living) terminus; and "terminal moiety" means a group or functionality located at a terminus.

Throughout this document, all values given in the form of percentages are weight percentages unless the surrounding text explicitly indicates a contrary intention. The relevant portion(s) of any patent or publication mentioned herein is or are incorporated by reference.

DETAILED DESCRIPTION OF ILLUSTRATIVE EMBODIMENTS

As apparent from the foregoing, the polymer can be described or characterized in a variety of ways. Generally, it includes unsaturated mer units, typically units derived from one or more types of polyenes, and terminal functionality that includes a group 2-13 element. The group 2-13 element advantageously can be provided as part of the radical of an α,β-ethylenically unsaturated compound. The polymer can be provided by reacting a terminally active polymer with an α,β-ethylenically unsaturated compound such as, for example, a (meth)acrylate.

The polymer can be elastomeric and can include mer units that include ethylenic unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like. In certain embodiments, the polymer includes only polyene mer and, in some of those embodiments, only conjugated diene mer.

Polyenes can incorporate into polymeric chains in more than one way. Especially for polymers intended for use in the manufacture of tire treads, controlling this manner of incorporation can be desirable. A polymer chain with an overall 1,2-microstructure, given as a numerical percentage based on total polyene content, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be "substantially linear." For certain end use applications, however, keeping the content of 1,2-linkages to less than ~7%, less than 5%, less than 2%, or less than 1% can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, living polymerizations are described first followed by a description of coordination catalyst-catalyzed polymerizations. After these descriptions, the functionalization and processing of polymers so made are discussed.

Solution polymerization typically involves an initiator such as an organolithium compound, particularly alkyl-lithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutyl-aminolithium and the like; dialkylaminoalkyllithium compounds such as diethylamino-propyl-lithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithio-pentane, 1,5,15-trilithioeicosane, 1,3,5- trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to ~150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to ~150,000 Daltons.

Certain end use applications call for polymers that have properties that can be difficult or inefficient to achieve via anionic (living) polymerizations. For example, in some applications, conjugated diene polymers having high cis-1,4-linkage contents can be desirable. Polydienes can be prepared by processes using catalysts (as opposed to the initiators employed in living polymerizations) and may display pseudo-living characteristics, i.e., terminals that are not technically living but which display many of the same reactive characteristics.

Some catalyst systems preferentially result in cis-1,4-polydienes, while others preferentially provide trans-1,4-polydienes. The ordinarily skilled artisan is familiar with examples of each type of system. The remainder of this description is based on a particular cis-specific catalyst system, although this merely is for sake of exemplification and is not considered to be limiting to the functionalizing method and compounds.

Exemplary catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes.

Preferred lanthanide-based catalyst compositions are described in detail in, for example, U.S. Pat. No. 6,699,813 and patent documents cited therein. The term "catalyst composition" is intended to encompass a simple mixture of ingredients, a complex of various ingredients that is caused by physical or chemical forces of attraction, a chemical reaction product of some or all of the ingredients, or a combination of the foregoing. A condensed description is provided here for convenience and ease of reference.

Exemplary lanthanide catalyst compositions include (a) a lanthanide compound, an alkylating agent and a halogen-containing compound (although use of a halogen-containing compound is optional when the lanthanide compound and/or the alkylating agent contains a halogen atom); (b) a lanthanide compound and an aluminoxane; or (c) a lanthanide compound, an alkylating agent, and a non-coordinating anion or precursor thereof.

Various lanthanide compounds or mixtures thereof can be employed. These compounds preferably are soluble in hydrocarbon solvents such as aromatic hydrocarbons, e.g., benzene, toluene, xylenes, (di)ethylbenzene, mesitylene, and the like; aliphatic hydrocarbons such as linear and branched $C_5$-$C_{10}$ alkanes, petroleum ether, kerosene, petroleum spirits, and the like; or cycloaliphatic hydrocarbons such as cyclopentane, cyclohexane, methylcyclopentane, methylcyclohexane, and the like; although hydrocarbon-insoluble lanthanide compounds can be suspended in the polymerization medium. Preferred lanthanide compounds include those which include at least one Nd, La, or Sm atom or those including didymium (a commercial mixture of rare-earth elements obtained from monazite sand). The lanthanide atom(s) in the lanthanide compounds can be in any of a number of oxidation states, although compounds having a lanthanide atom in the +3 oxidation state typically are employed. Exemplary lanthanide compounds include carboxylates, organophosphates, organophosphonates, organophosphinates, xanthates, carbamates, dithiocarbamates, β-diketonates, alkoxides, aryloxides, halides, pseudo-halides, oxyhalides, and the like; numerous examples of each of these types of lanthanide compounds can be found in the aforementioned U.S. Pat. No. 6,699,813 as well as other similar patent documents.

Typically, the lanthanide compound is used in conjunction with one or more alkylating agents, i.e., organometallic compounds that can transfer hydrocarbyl groups to another metal. Typically, these agents are organometallic compounds of electropositive metals such as Groups 1, 2, and 3 metals. Exemplary alkylating agents include organoaluminum compounds such as those having the general formula $AlR^2_o Z_{3-o}$ (where o is an integer of from 1 to 3 inclusive; each $R^2$ independently is a monovalent organic group, which may contain heteroatoms such as N, O, B, Si, S, P, and the like, connected to the Al atom via a C atom; and each Z independently is a hydrogen atom, a halogen atom, a carboxylate group, an alkoxide group, or an aryloxide group) and oligomeric linear or cyclic aluminoxanes, which can be made by reacting trihydro-carbylaluminum compounds with water, as well as organomagnesium compounds such as those having the general formula $R^3_m MgZ_{2-m}$ where Z is defined as above, m is 1 or 2, and $R^3$ is the same as $R^2$ except that each monovalent organic group is connected to the Mg atom via a C atom.

Some catalyst compositions can contain compounds with one or more labile halogen atoms. Preferably, the halogen-containing compounds are soluble in hydrocarbon solvents such as those described above with respect to lanthanide compounds, although hydrocarbon-insoluble compounds can be suspended in the polymerization medium. Useful halogen-containing compounds include elemental halogens, mixed halogens, hydrogen halides, organic halides, inorganic halides, metallic halides, organometallic halides, and mixtures of any two or more of the foregoing.

Other catalyst compositions contain a non-coordinating anion or a non-coordinating anion precursor. Exemplary non-coordinating anions include tetraarylborate anions, particularly fluorinated tetraarylborate anions. Exemplary non-coordinating anion precursors include boron compounds that include strong electron-withdrawing groups.

Catalyst compositions of the type just described have very high catalytic activity for polymerizing conjugated dienes into stereospecific polydienes over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for each ingredient can depend on the concentrations of the other ingredients. The following molar ratios are considered to be relatively exemplary for a variety of different systems based on the foregoing ingredients:

alkylating agent to lanthanide compound (alkylating agent/Ln): from ~1:1 to ~200:1, preferably from ~2:1 to ~100:1, more preferably from ~5:1 to ~50:1;

halogen-containing compound to lanthanide compound (halogen atom/Ln): from ~1:2 to ~20:1, preferably from ~1:1 to ~10:1, more preferably from ~2:1 to ~6:1;

aluminoxane to lanthanide compound, specifically equivalents of aluminum atoms on the aluminoxane to equivalents of lanthanide atoms in the lanthanide compound (Al/Ln): from ~50:1 to ~50,000:1, preferably from ~75:1 to ~30,000:1, more preferably from ~100:1 to ~1,000:1; and non-coordinating anion or precursor to lanthanide compound (An/Ln): from ~1:2 to ~20:1, preferably from ~3:4 to ~10:1, more preferably from ~1:1 to ~6:1.

The molecular weight of polydienes produced with lanthanide-based catalysts can be controlled by adjusting the amount of catalyst used and/or the amounts of co-catalyst concentrations within the catalyst system; polydienes having a wide range of molecular weights can be produced in this manner. In general, increasing the catalyst and co-catalyst concentrations reduces the molecular weight of resulting polydienes, although very low molecular weight polydienes (e.g., liquid polydienes) require extremely high catalyst concentrations. Typically, this necessitates removal of catalyst residues from the polymer to avoid adverse effects such as retardation of the sulfur cure rate. U.S. Pat. No. 6,699,813 teaches that nickel compounds can be used as very efficient molecular weight regulators. Including one or more Ni-containing compounds to lanthanide-based catalyst compositions advantageously permits easy regulation of the molecular weight of the resulting polydiene without significant negative effects on catalyst activity and polymer microstructure.

Various Ni-containing compounds or mixtures thereof can be employed. The Ni-containing compounds preferably are soluble in hydrocarbon solvents such as those set forth above, although hydrocarbon-insoluble Ni-containing compounds can be suspended in the polymerization medium to form the catalytically active species.

The Ni atom in the Ni-containing compounds can be in any of a number of oxidation states including the 0, +2, +3, and +4 oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudo-halides, oxyhalides, organonickel compounds (i.e., compounds containing at least one C—Ni bond such as, for example, nickelocene, decamethylnickelocene, etc.), and the like.

The molar ratio of the Ni-containing compound to the lanthanide compound (Ni/Ln) generally ranges from ~1:1000 to ~1:1, preferably from ~1:200 to ~1:2, and more preferably from ~1:100 to ~1:5.

These types of catalyst compositions can be formed using any of the following methods:

(1) In situ. The catalyst ingredients are added to a solution containing monomer and solvent (or simply bulk monomer). The addition can occur in a stepwise or simultaneous manner. In the case of the latter, the alkylating agent preferably is added first followed by, in order, the lanthanide compound, the nickel-containing compound (if used), and (if used) the halogen-containing compound or the non-coordinating anion or non-coordinating anion precursor.

(2) Pre-mixed. The ingredients can be mixed outside the polymerization system, generally at a temperature of from about −20° to ~80° C., before being introduced to the conjugated diene monomer(s).

(3) Pre-formed in the presence of monomer(s). The catalyst ingredients are mixed in the presence of a small amount of conjugated diene monomer(s) at a temperature of from about −20° to ~80° C. The amount of conjugated diene monomer can range from ~1 to ~500 moles, preferably from ~5 to ~250 moles, and more preferably from ~10 to ~100 moles, per mole of the lanthanide compound. The resulting catalyst composition is added to the remainder of the conjugated diene monomer(s) to be polymerized.

(4) Two-stage procedure.
  (a) The alkylating agent is combined with the lanthanide compound in the absence of conjugated diene monomer, or in the presence of a small amount of conjugated diene monomer, at a temperature of from about −20° to ~80° C.
  (b) The foregoing mixture and the remaining components are charged in either a stepwise or simultaneous manner to the remainder of the conjugated diene monomer(s) to be polymerized.

(The Ni-containing compound, if used, can be included in either stage)

When a solution of one or more of the catalyst ingredients is prepared outside the polymerization system in the foregoing methods, an organic solvent or carrier is preferably employed. Useful organic solvents include those mentioned previously.

The production of cis-1,4-polydiene is accomplished by polymerizing conjugated diene monomer(s) in the presence of a catalytically effective amount of a catalyst composition. The total catalyst concentration to be employed in the polymerization mass depends on the inter-play of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.05 to ~0.5 mmol per 100 g conjugated diene monomer. All other ingredients generally are added in amounts that are based on the amount of lanthanide compound (see the various ratios set forth previously).

Polymerization preferably is carried out in an organic solvent, i.e., as a solution or precipitation polymerization where the monomer is in a condensed phase. The catalyst ingredients preferably are solubilized or suspended within the organic liquid. The concentration of monomer present in the polymerization medium at the beginning of the polymerization generally ranges from ~3 to ~80%, preferably from ~5 to ~50%, and more preferably from ~10% to ~30% by weight. (Polymerization also can be carried out by means of bulk polymerization conducted either in a condensed liquid phase or in a gas phase.)

Regardless of whether a batch, continuous, or semi-continuous process is employed, the polymerization preferably is conducted with moderate to vigorous agitation under anaerobic conditions provided by an inert protective gas such as $N_2$, Ar or He. The polymerization temperature may vary widely, although typically a temperature of from ~20° to ~90° C. is employed; heat can be removed by external cooling and/or cooling by evaporation of the monomer or the solvent. The polymerization pressure employed may vary widely, although typically a pressure of from ~0.1 to ~1 MPa is employed.

Where 1,3-butadiene is polymerized in a coordination catalyst system, the cis-1,4-polybutadiene generally has a $M_n$, as determined by GPC using polystyrene standards, of from ~5,000 to ~200,000 Daltons, from ~25,000 to ~150,000 Daltons, or from ~50,000 to ~120,000 Daltons. The polydispersity of the polymers generally ranges from ~1.5 to ~5.0, typically from ~2.0 to ~4.0.

Resulting polydienes advantageously can have a cis-1,4-linkage content of at least ~60%, at least ~75%, at least ~90%, and even at least ~95%, and a 1,2-linkage content of less than ~7%, less than ~5%, less than ~2%, and even less than ~1%.

Both of the described polymerization processes advantageously result in polymer chains that possess active (living or pseudo-living) terminals, which can be further reacted with one or more functionalizing agents so as to provide functionalized polymers. As described above, functionalization can enhance the interaction between the polymer and particulate fillers in rubber compounds, thereby improving the mechanical and dynamic properties of the resulting vulcanizates.

As mentioned above, the polymer includes terminal functionality. This polymer, hereinafter referred to as the functionalized polymer, can be provided by reacting one or more terminally active polymer chains with an α,β-ethylenically unsaturated compound that includes a group 2-13 element, i.e., elements with atomic numbers 4-5, 12-13, 20-31, 38-49, 56, 71-81, 88 and 103-113.

Representative α,β-ethylenically unsaturated compounds include those defined by general formula I above. Within the genus defined by the formula, certain species can be preferred for some applications. For example, one subset of preferred compounds can be represented by the general formula

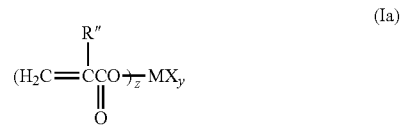

where R″ is a hydrogen atom or $C_1$-$C_3$ alkyl group and the other variables are defined as above in connection with formula (I). Formula (Ia) compounds include acrylates and (alk)acrylates (i.e., 2-alkyl-2-alkenoic acid esters). Preferred (alk)acrylates are methacrylates.

Other species within formula (I) are metal esters of 3-alkyl-2-alkenoic acid and 2,3-dialkyl-2-alkenoic acid, represented by formulas (Ib) and (Ic):

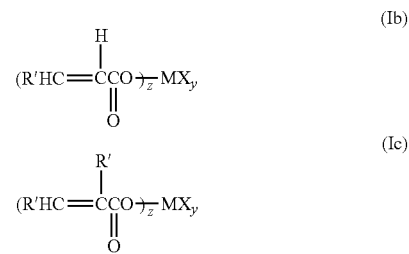

where each of M, X, y and z is defined as above in connection with formula (I) and each R′ independently is a $C_1$-$C_{10}$ alkyl group, preferably a $C_1$-$C_3$ alkyl group. Where R′ in formula (Ib) and each R′ in formula (Ic) is a methyl group, the compounds are, respectively, metal esters of crotonic acid and angelic acid (where the R′ groups are trans) or tiglic acid (where the R′ groups are cis).

A subset of preferred compounds include those defined by general formula (I) where M is B (with 0≤y≤2), Al (with 0≤y≤2), or Zn (with 0≤y≤1).

Another subset of preferred compounds include those defined by general formula (I) where each X is the same, i.e., each X is $R^1$, OC(O)$R^1$, C(O)O$R^1$ or N$R^1_2$ in which each $R^1$ is a $C_1$-$C_{30}$ alkyl group, advantageously a $C_1$-$C_{10}$ alkyl group, and preferably a $C_1$-$C_6$ alkyl group. Where each or at least one X is $R^1$, it preferably is a methyl, ethyl, propyl, or isobutyl group.

The foregoing preferences with respect to M and X can be combined into any of general formulas (Ia)-(Ic) to provide specific preferred compounds. Specific examples of such compounds are identified below in the Examples section;

these are not intended to be limiting and, instead, should be considered as illustrative of the types of compounds that can be useful and the benefits that the ordinarily skilled artisan can expect to receive from their use.

The amount of α,β-ethylenically unsaturated compound(s) added to the polymer cement need not be particularly large. Relative to the moles of active termini (i.e., live or otherwise reactive polymer chain ends), from ~1 to ~10 moles of one or more α,β-ethylenically unsaturated compounds can be added to the polymer cement.

Because of the activity of, for example, carbanionic polymer chains, essentially all of the added α,β-ethylenically unsaturated compound(s) will add to polymer chain termini and will do so in an essentially proportional manner, e.g., addition of ~3 moles of α,β-ethylenically unsaturated compound will result in addition of 3 mer of α,β-ethylenically unsaturated compound to each active polymer chain.

The result of this reaction is a polymer with terminal functionality as defined by general formula (II). In that formula, n can be an integer of from 1 to 10 inclusive as well as all possible subcombination ranges within that range, for example, 1 to r where $2 \leq r \leq 9$, 2 to s where $3 \leq s \leq 9$, 4 to t where $5 \leq t \leq 9$, etc.

Where z>1 in a formula (I) compound, more than one polymer chain (π) can be attached (indirectly) to M in formula (II). In such a case, the formula (I) compound radical acts a coupling agent, i.e., a locus for more than one attached polymer chain.

Reaction of such α,β-ethylenically unsaturated compounds with a terminally active polymer can be performed relatively quickly (~1 to 300 minutes) at moderate temperatures (e.g., 0° to 75° C.). Bonding typically occurs between a C atom of the terminally active portion of the polymer chain and a Si or Sn atom of the (ring opened) cyclic compound, with one of the substituents of the Si or Sn atom optionally acting as a leaving group.

Although typically not required, if desired, quenching can be conducted by stirring the polymer and an active hydrogen-containing compound, such as an alcohol or acid, for up to ~120 minutes at temperatures of from ~25° to ~150° C. Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]-tetrasulfide.

Addition of a processing aid can be used to reduce the amount of silane employed; see, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

Examples 1-4: Metal Ester Compounds

In a $N_2$-purged vessel equipped with a stirrer was added ~25 mL of a 0.68 M solution of triisobutyl aluminum in hexane. This vessel was maintained at −78° C. while ~13.7 mL of a 1.24 M solution of acrylic acid in THF was added in dropwise fashion. After addition was complete, the contents of the vessel were allowed to come to room temperature slowly and then stirred for an additional ~10 minutes. Proton NMR spectroscopy results were consistent with diisobutylaluminum acrylate. The colorless solution (~0.44 M) is designated Example 1 in the remaining examples.

In a $N_2$-purged vessel equipped with a stirrer was added ~20 mL of a 1.0 M solution of diethyl zinc in hexane. The vessel was maintained at −78° C. while ~20 mL of a 1.0 M solution of acrylic acid in THF was added in dropwise fashion. After addition was complete, the contents of the vessel were warmed and stirred as described in the preceding paragraph. Proton NMR spectroscopy results were consistent with ethyl zinc acrylate. The colorless solution (~0.5 M) is designated Example 2 below.

In an Ar-purged three-necked flask equipped with a stirrer and a pressure equalizing funnel was added ~17 mL of a 1.0 M solution of triethylborane in THF. The vessel was cooled to −78° C. before a mixture of 1.16 mL (17 mmol) acrylic acid (after passing through an inhibitor remover) and 5 mL dry THF was added to the funnel and dropped into the flask over ~10 minutes. After addition was complete, the flask was removed from the cooling bath and its contents slowly allowed to come to room temperature and then stirred for an additional ~60 minutes. This solution of diethyl boron acrylate in THF, designated Example 3 below, was used without further purification.

In a $N_2$-purged vessel equipped with a stirrer was added ~25 mL of a 0.68 M solution of triisobutyl aluminum in hexane. This vessel was maintained at −78° C. while ~17 mL of a 1.0 M solution of crotonic acid in THF was added in dropwise fashion. After addition was complete, the contents of the vessel were warmed and stirred as in Example 1 above. Proton NMR spectroscopy results were consistent with diisobutylaluminum crotonate. The colorless solution (~0.4 M) is designated as Example 4 in the remaining examples.

The metal ester compounds were used in the remaining examples to provide functionalized polymers. The polymers were prepared in dried glass vessels previously sealed with extracted septum liners and perforated crown caps under a positive $N_2$ purge unless otherwise indicated. The polymerizations employed hexane, butadiene solutions (various concentrations in hexane), styrene solutions (various concentrations in hexane), n-butyllithium (various concentrations in hexane), 2,2-bis(2'-tetrahydrofuryl)propane solution (various concentrations in hexane, stored over $CaH_2$), and 2,6-di-tert-butyl-4-methylphenol (BHT) solution in hexane.

Examples 5-8: Aluminum Acrylate Functionalized Interpolymers

To a $N_2$-purged reactor equipped with a stirrer was added 1.55 kg hexane, 0.37 kg styrene solution (34.5% by wt.), and 2.29 kg butadiene solution (22.3% by wt.). The reactor was charged with 3.17 mL of 1.68 M n-butyllithium solution, followed by 1.2 mL of 1.6 M 2,2-bis(2'-tetrahydrofuryl) propane solution. The reactor jacket was heated to 50° C. and the contents stirred for ~75 minutes.

The polymer cement, which had a styrene content (relative to total mer content) of 20.8% and a vinyl content (i.e., 1,2-microstructure) of 54.9%, was dropped into four evacuated bottles. One of these (sample 5) was terminated with isopropanol before being coagulated with isopropanol containing BHT.

The portions of the polymer cement in the other three bottles were reacted with varying amounts of the diisobutylaluminum acrylate from Example 1,
sample 6—1:1,
sample 7—3:1, and
sample 8—5:1,
with the ratios representing the molar ratio of acrylate to lithium initiator, which essentially corresponds to the moles of live polymer chains. The bottles containing samples 6-8 were agitated for ~30 minutes at room temperature before water (1, 3 and 5 g, respectively, per 400 g polymer cement)

was added to terminate the living chain ends. These polymer cements were coagulated with isopropanol containing BHT similarly to sample 5.

Each of samples 5 to 8 was drum dried. Properties of the control polymer (sample 5) and the functionalized polymers (samples 6-8) are summarized in Table 1, where $M_p$ represents peak molecular weight.

Cold flow testing was performed using a Scott™ tester (PTES Equipment Services, Inc.; Johnston, R.I.). Samples were prepared by melt pressing 2.5 g of polymer at 100° C. for 20 minutes in a mold using a preheated press. The resulting cylindrical samples, which had a uniform thickness of ~12 mm, were allowed to cool to room temperature before being removed from the mold. Samples were placed individually under the weight of a calibrated 5 kg weight. Sample thicknesses were recorded as a function of time, starting from the time that the weight was released. Sample thickness at the conclusion of ~30 minutes generally is considered to be an acceptable indicator of resistance to cold flow for this type of polymer, and that is the value presented in the following table.

TABLE 1

Properties of polymers from Examples 5-8

|  | 5 | 6 | 7 | 8 |
|---|---|---|---|---|
| $M_n$ (kg/mol) | 117 | 134 | 231 | 135 |
| $M_w/M_n$ | 1.05 | 1.23 | 1.63 | 1.51 |
| $M_p$ (kg/mol) | 121 | 122 | 248 | 246 |
| $T_g$ (° C.) | −35.6 | −36.1 | −35.8 | −36.1 |
| % coupling | 1.4 | 22.8 | * | 51.7 |
| cold flow (mm) | 2.2 | 4.6 | 7.1 | 6.8 |

* Indefinite.

Examples 9-12: Zinc Acrylate Functionalized Interpolymers

The polymerization procedure from Examples 5-8 was essentially repeated using 4.38 kg hexane, 1.20 kg styrene solution (34.0% by wt.), 7.93 kg butadiene solution (20.6% by wt.), 10.63 mL of 1.60 M n-butyllithium solution, and 3.5 mL of 1.6 M 2,2-bis(2'-tetrahydro-furyl)propane solution. The contents were stirred for ~60 minutes after the reactor jacket was heated to 50° C.

The polymer cement, which had a styrene content of 20.1% and a vinyl content of 57.6%, was dropped into four evacuated bottles. One of these (sample 9) was terminated with isopropanol and then coagulated with isopropanol containing BHT.

The portions of the polymer cement in the other three bottles were reacted with the ethyl zinc acrylate from Example 2, using the same 1:1, 3:1 and 5:1 ratios employed in Examples 5-8.

These polymer cements were reacted and processed identically to those from Examples 5-8. Properties of the control polymer (sample 9) and the functionalized polymers (samples 10-12) are summarized in Table 2. (Mooney viscosity ($ML_{1+4}$) values were determined with an Alpha Technologies™ Mooney viscometer (large rotor) using a one-minute warm-up time and a four-minute running time)

TABLE 2

Properties of polymers from Examples 9-12

|  | 9 | 10 | 11 | 12 |
|---|---|---|---|---|
| $M_n$ (kg/mol) | 113 | 120 | 147 | 183 |
| $M_w/M_n$ | 1.04 | 1.54 | 2.29 | 1.97 |
| $M_p$ (kg/mol) | 117 | 115 | 117 | 236 |
| $ML_{1+4}$ @ 100° C. | 12.0 | 25.5 | 60.5 | 76.3 |
| $t_{80}$ (sec) | 0.92 | 1.36 | 2.44 | 2.61 |
| % coupling | 1.4 | 10.8 | 41.1 | 70.1 |
| cold flow (mm) | 2.3 | 3.1 | 5.5 | 6.4 |

Examples 13-16: Boron Acrylate Functionalized Interpolymers

The polymerization procedure from Examples 5-8 was essentially repeated using 3.91 kg hexane, 0.97 kg styrene solution (34.0% by wt.), 6.36 kg butadiene solution (21.4% by wt.), 8.59 mL of 1.65 M n-butyllithium solution, and 5.14 mL of 1.0 M 2,2-bis(2'-tetrahydro-furyl)propane solution. The reactor jacket was heated to ~71° C., and its contents were stirred for ~30 minutes after a peak temperature was reached.

The polymer cement, which had a styrene content of 20.2% and a vinyl content of 57.6%, was dropped into four evacuated bottles. One of these (sample 13) was terminated with isopropanol and then coagulated with isopropanol containing BHT.

The portions of the polymer cement in the other three bottles were reacted with the diethyl boron acrylate from Example 3, using the same 1:1, 3:1 and 5:1 ratios employed in Examples 5-8.

These polymer cements were reacted and processed identically to those from Examples 5-8. Properties of the control polymer (sample 13) and the functionalized polymers (samples 14-16) are summarized in Table 3.

TABLE 3

Properties of polymers from Examples 13-16

|  | 13 | 14 | 15 | 16 |
|---|---|---|---|---|
| $M_n$ (kg/mol) | 133 | 139 | 185 | 187 |
| $M_w/M_n$ | 1.1 | 1.2 | 1.4 | 1.4 |
| $M_p$ (kg/mol) | 138 | 138 | 139 | 140 |
| $ML_{1+4}$ @ 100° C. | 25.6 | 31.0 | 63.8 | 65.8 |
| $t_{80}$ (sec) | 1.0 | 1.2 | 2.1 | 2.2 |
| % coupling | 4 | 9 | 49 | 50 |
| cold flow (mm) | 2.9 | 3.1 | 4.5 | 4.5 |

Examples 17-19: Aluminum Crotonate Functionalized Interpolymers

The polymerization procedure from Examples 5-8 was essentially repeated using 4.53 kg hexane, 1.17 kg styrene solution (35.0% by wt.), 7.81 kg butadiene solution (20.9% by wt.), 10.31 mL of 1.65 M n-butyllithium solution, and 3.51 mL of 1.6 M 2,2-bis(2'-tetrahydro-furyl)propane solution. The contents were stirred for ~80 minutes after the reactor jacket was heated to 50° C.

The polymer cement, which had a styrene content of 19.9% and a vinyl content of 56.9%, was dropped into three evacuated bottles. One of these (sample 17) was terminated with isopropanol and then coagulated with isopropanol containing BHT.

The portions of the polymer cement in the other two bottles were reacted with the diisobutyl aluminum crotonate from Example 4 using, respectively, 1:1 and 3:1 ratios relative to moles of Li.

These polymer cements were reacted and processed identically to those from Examples 5-8. Properties of the control polymer (sample 17) and the functionalized polymers (samples 18-19) are summarized in Table 3.

TABLE 4

Properties of polymers from Examples 17-19

|  | 17 | 18 | 19 |
|---|---|---|---|
| $M_n$ (kg/mol) | 121 | 168 | 166 |
| $M_w/M_n$ | 1.05 | 1.27 | 1.30 |
| $M_p$ (kg/mol) | 126 | 263 | 262 |
| $ML_{1+4}$ @ 100° C. | 15.9 | 76.4 | 82.4 |
| $t_{80}$ (sec) | 0.95 | 2.50 | 2.36 |
| % coupling | 1.4 | 47.1 | 63.8 |
| cold flow (mm) | 2.3 | 4.9 | 5.0 |

Examples 20-42: Filled Compositions and Vulcanizates

The polymers from Examples 5-8, 9-12, 13-16 and 17-19 were used to make filled compositions (compounds), employing the formulation shown in Table 5a (silica as sole particulate filler) and Table 5b (carbon black as sole particulate filler) where N-phenyl-N'-(1,3-dimethylbutyl)-p-phenylenediamine (6PPD) acts as an antioxidant and 2,2'-dithiobis(benzo-thiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic compounds.

TABLE 5a

Silica compound formulation

|  | Amount (phr) |
|---|---|
| Masterbatch |  |
| synthetic polymer | 80 |
| natural rubber | 20 |
| silica | 52.5 |
| wax | 2 |
| 6PPD | 0.95 |
| stearic acid | 2 |
| black oil | 10 |
| Re-mill |  |
| 60% disulfide silane on carrier | 5 |
| silica | 2.5 |
| Final |  |
| sulfur | 1.5 |
| ZnO | 2.5 |
| MBTS | 2 |
| TBBS | 0.7 |
| DPG | 1.4 |
| TOTAL | 183.05 |

TABLE 5b

Carbon black compound formulation

|  | Amount (phr) |
|---|---|
| Masterbatch |  |
| synthesized polymer | 100 |
| carbon black (N343 type) | 50 |
| wax | 2 |
| 6PPD | 0.95 |
| stearic acid | 2 |
| black oil | 10 |
| Final |  |
| sulfur | 1.5 |
| ZnO | 2.5 |
| TBBS | 0.5 |
| MBTS | 0.5 |
| DPG | 0.3 |
| TOTAL | 170.25 |

Compounds were cured for ~15 minutes at 171° C. Results of physical testing on these compounds are shown in the following tables:

Table 6a: Examples 20-23—silica compounds, polymers from Examples 5-8

Table 6b: Examples 24-27—silica compounds, polymers from Examples 9-12

Table 6c: Examples 28-31—silica compounds, polymers from Examples 13-16

Table 6d: Examples 32-34—silica compounds, polymers from Examples 17-19

Table 7a: Examples 35-38—carbon black compounds, polymers from Examples 9-12

Table 7b: Examples 39-42—carbon black compounds, polymers from Examples 13-16

Results of physical testing on vulcanizates made from these polymers also are summarized in these tables. For the "Temp. sweep" line, the top row of data are from measurements at 0° C. while the bottom row are from measurements at 60° C.

Tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep). With respect to tensile properties, $M_J$ is modulus at J % elongation, $T_b$ is tensile strength at break, and $E_b$ is percent elongation at break.

TABLE 6a

Compound & vulcanizate properties, aluminum acrylate (silica compound)

|  | 20 | 21 | 22 | 23 |
|---|---|---|---|---|
| synthetic polymer (sample no.) | 5 | 6 | 7 | 8 |
| $ML_{1+4}$ @ 130° C. (final) | 18.9 | 26.9 | 48.8 | 44.8 |
| Tensile @ 23° C. (final, unaged) |  |  |  |  |
| $M_{50}$ (MPa) | 1.35 | 1.36 | 1.21 | 1.21 |
| $T_b$ (MPa) | 12.9 | 14.6 | 17.4 | 14.5 |
| $E_b$ (%) | 468 | 504 | 598 | 521 |

TABLE 6a-continued

Compound & vulcanizate properties, aluminum acrylate (silica compound)

|  | 20 | 21 | 22 | 23 |
|---|---|---|---|---|
| Tensile @ 100° C. (final, unaged) | | | | |
| $M_{50}$ (MPa) | 1.28 | 1.14 | 1.13 | 1.13 |
| $T_b$ (MPa) | 7.4 | 6.9 | 7.3 | 7.8 |
| $E_b$ (%) | 310 | 300 | 325 | 342 |
| Strain sweep (60° C., 10 Hz, 5% strain, final) | | | | |
| G' (MPa) | 4.21 | 3.15 | 2.69 | 2.81 |
| G'' (MPa) | 0.64 | 0.37 | 0.24 | 0.26 |
| tan δ | 0.1526 | 0.1188 | 0.0882 | 0.0941 |
| ΔG' (MPa) | 4.72 | 2.24 | 0.97 | 1.24 |
| Bound rubber (%) | 21.2 | 26.2 | 33.9 | 32.7 |

TABLE 6b

Compound & vulcanizate properties, zinc acrylate (silica compound)

|  | 24 | 25 | 26 | 27 |
|---|---|---|---|---|
| synthetic polymer (sample no.) | 9 | 10 | 11 | 12 |
| $ML_{1+4}$ @ 130° C. (final) | 18.1 | 20.8 | 35.1 | 44.2 |
| Tensile @ 23° C. (final, unaged) | | | | |
| $M_{50}$ (MPa) | 2.03 | 2.16 | 2.08 | 2.19 |
| $T_b$ (MPa) | 14.6 | 14.1 | 15.8 | 13.6 |
| $E_b$ (%) | 309 | 294 | 312 | 283 |
| Tensile @ 100° C. (final, unaged) | | | | |
| $M_{50}$ (MPa) | 1.94 | 1.95 | 2.03 | 2.04 |
| $T_b$ (MPa) | 6.6 | 7.3 | 7.7 | 8.2 |
| $E_b$ (%) | 178 | 190 | 192 | 205 |
| Strain sweep (60° C., 10 Hz, 5% strain, final) | | | | |
| G' (MPa) | 3.29 | 3.17 | 2.75 | 2.72 |
| tan δ | 0.167 | 0.154 | 0.120 | 0.119 |
| ΔG' (MPa) | 3.89 | 3.20 | 1.77 | 1.71 |
| Bound rubber (%) | 25.1 | 30.8 | 45.0 | 47.4 |

TABLE 6c

Compound & vulcanizate properties, boron acrylate (silica compound)

|  | 28 | 29 | 30 | 31 |
|---|---|---|---|---|
| synthetic polymer (sample no.) | 13 | 14 | 15 | 16 |
| $ML_{1+4}$ @ 130° C. (final) | 22.2 | 23.8 | 43.9 | 43.6 |
| Tensile @ 23° C. (final, unaged) | | | | |
| $M_{50}$ (MPa) | 2.09 | 2.16 | 2.14 | 2.06 |
| $T_b$ (MPa) | 11.1 | 15.3 | 14.6 | 15.9 |
| $E_b$ (%) | 249 | 305 | 302 | 321 |
| Tensile @ 100° C. (final, unaged) | | | | |
| $M_{50}$ (MPa) | 2.00 | 2.05 | 2.11 | 2.09 |
| $T_b$ (MPa) | 6.9 | 7.6 | 8.3 | 7.4 |
| $E_b$ (%) | 178 | 188 | 200 | 179 |

TABLE 6c-continued

Compound & vulcanizate properties, boron acrylate (silica compound)

|  | 28 | 29 | 30 | 31 |
|---|---|---|---|---|
| Strain sweep (60° C., 10 Hz, 5% strain, final) | | | | |
| G' (MPa) | 3.21 | 3.63 | 3.70 | 3.32 |
| tan δ | 0.170 | 0.146 | 0.128 | 0.130 |
| ΔG' (MPa) | 4.09 | 4.14 | 3.74 | 3.15 |
| Bound rubber (%) | 15.9 | 18.4 | 20.7 | 22.5 |

TABLE 6d

Compound & vulcanizate properties, aluminum crotonate (silica compound)

|  | 32 | 33 | 34 |
|---|---|---|---|
| synthetic polymer (sample no.) | 17 | 18 | 19 |
| $ML_{1+4}$ @ 130° C. (final) | 42.8 | 43.8 | 50.3 |
| Tensile @ 23° C. (final, unaged) | | | |
| $M_{50}$ (MPa) | 2.15 | 2.02 | 2.06 |
| $T_b$ (MPa) | 13.5 | 14.8 | 15.3 |
| $E_b$ (%) | 272 | 306 | 318 |
| Tensile @ 100° C. (final, unaged) | | | |
| $M_{50}$ (MPa) | 2.07 | 1.96 | 1.91 |
| $T_b$ (MPa) | 6.5 | 6.5 | 6.9 |
| $E_b$ (%) | 162 | 171 | 186 |
| Strain sweep (60° C., 10 Hz, 5% strain, final) | | | |
| G' (MPa) | 4.11 | 3.79 | 3.22 |
| tan δ | 0.126 | 0.120 | 0.112 |
| ΔG' (MPa) | 4.14 | 3.30 | 2.31 |

TABLE 7a

Compound & vulcanizate properties, zinc acrylate (carbon black compound)

|  | 35 | 36 | 37 | 38 |
|---|---|---|---|---|
| synthetic polymer (sample no.) | 9 | 10 | 11 | 12 |
| $ML_{1+4}$ @ 130° C. (final) | 19.7 | 22.9 | 34.4 | 51.5 |
| Tensile @ 23° C. (final, unaged) | | | | |
| $M_{50}$ (MPa) | 1.92 | 1.93 | 1.93 | 1.85 |
| $T_b$ (MPa) | 17.3 | 14.5 | 18.8 | 20.2 |
| $E_b$ (%) | 372 | 310 | 397 | 394 |
| Tensile @ 100° C. (final, unaged) | | | | |
| $M_{50}$ (MPa) | 1.61 | 1.56 | 1.61 | 1.66 |
| $T_b$ (MPa) | 8.5 | 8.7 | 8.8 | 8.7 |
| $E_b$ (%) | 229 | 239 | 235 | 211 |
| Strain sweep (60° C., 10 Hz, 5% strain, final) | | | | |
| G' (MPa) | 2.94 | 2.83 | 2.62 | 2.50 |
| tan δ | 0.234 | 0.225 | 0.183 | 0.162 |
| ΔG' (MPa) | 3.87 | 3.36 | 2.21 | 1.59 |
| Bound rubber (%) | 7.6 | 9.1 | 14.5 | 20.6 |

TABLE 7b

Compound & vulcanizate properties,
boron acrylate (carbon black compound)

|  | 39 | 40 | 41 | 42 |
|---|---|---|---|---|
| synthetic polymer (sample no.) | 13 | 14 | 15 | 16 |
| $ML_{1+4}$ @ 130° C. (final) | 30.9 | 33.0 | 54.2 | 55.2 |
| Tensile @ 23° C. (final, unaged) | | | | |
| $M_{50}$ (MPa) | 1.86 | 1.81 | 1.72 | 1.73 |
| $T_b$ (MPa) | 16.6 | 15.2 | 19.7 | 20.0 |
| $E_b$ (%) | 349 | 320 | 377 | 372 |
| Tensile @ 100° C. (final, unaged) | | | | |
| $M_{50}$ (MPa) | 1.57 | 1.62 | 1.60 | 1.60 |
| $T_b$ (MPa) | 6.4 | 8.7 | 9.3 | 8.8 |
| $E_b$ (%) | 178 | 223 | 222 | 205 |
| Strain sweep (60° C., 10 Hz, 5% strain, final) | | | | |
| G' (MPa) | 2.67 | 2.45 | 2.27 | 2.27 |
| tan δ | 0.211 | 0.196 | 0.154 | 0.142 |
| ΔG' (MPa) | 2.97 | 2.20 | 1.32 | 1.12 |
| Bound rubber (%) | 12.9 | 16.7 | 23.3 | 24.8 |

Examples 43-45: Aluminum Acrylate Functionalized Cis-1,4-Polybutadiene

Two preformed catalyst compositions were aged for 15 minutes at room temperature prior to use. The compositions were prepared by mixing, in dry, $N_2$-flushed bottles, methylaluminoxane in toluene, 1,3-butadiene solution, neodymium versatate in cyclohexane, diisobutylaluminum hydride in hexane, and diethylaluminum chloride in hexane. The amounts of the components used for each were as follows:

TABLE 8

Catalyst ingredients

|  | Catalyst A | | Catalyst B | |
|---|---|---|---|---|
|  | Concentration | Amount | Concentration | Amount |
| methylaluminoxane | 1.45M | 13.2 mL | 1.45M | 14.6 mL |
| 1,3-butadiene solution | 21.3% (by wt.) | 3.0 g | 22.0% (by wt.) | 3.2 g |
| neodymium versatate | 0.537M | 0.36 mL | 0.537M | 0.39 mL |
| diisobutylaluminum hydride | 1.0M | 3.73 mL | 1.0M | 4.43 mL |
| diethylaluminum chloride | 1.07M | 0.72 mL | 1.07M | 0.79 mL |

To a $N_2$-purged reactor were added 1.23 kg hexane, 3.00 kg 1,3-butadiene solution (21.3% by wt.), and Catalyst A. The reactor jacket temperature was set to 60° C. and, ~60 minutes after addition of catalyst, the polymerization mixture was cooled to room temperature. This polymer is designated as sample 43 below.

A similar polymerization was carried out with 1.32 kg hexane, 2.91 kg 1,3-butadiene solution (22.0% by wt.), and Catalyst B. The resulting polymer is designated as sample 44 below.

Portions of samples 43 and 44 were coagulated with isopropanol containing BHT.

An additional portion of the sample 44 polymer cement was transferred to a bottle and reacted with the diisobutylaluminum acrylate from Example 1 at an 80:1 molar ratio (acrylate-to-Nd). This bottle was agitated for ~30 minutes in a 50° C. water bath before water (1 g per 400 g polymer cement) was added to terminate the pseudo-living chain ends. This cement also was coagulated with isopropanol containing BHT.

Each of samples 43-45 was drum dried. Properties of the control polymers (samples 43 and 44) and the functionalized polymer (sample 45) are summarized in Table 9, with cold flow measurements representing sample thicknesses at the conclusion of 8 minutes.

TABLE 9

Properties of polymers from Examples 43-45

|  | 43 | 44 | 45 |
|---|---|---|---|
| $M_n$ (kg/mol) | 162 | 135 | 143 |
| $M_w/M_n$ | 1.76 | 1.67 | 1.74 |
| $M_p$ (kg/mol) | 204 | 192 | 202 |
| cis-1,4 (%) | 93.8 | 93.6 | 93.5 |
| trans-1,4 (%) | 5.7 | 5.9 | 6.0 |
| vinyl content (%) | 0.5 | 0.5 | 0.6 |
| cold flow (mm) | 2.45 | 1.84 | 3.16 |

Examples 46-48: Filled Compositions and Vulcanizates

The polymers from Examples 43-45 were used to make filled compositions (compounds), employing the carbon black formulation from Table 5b with the following modification: 20 phr of the synthesized polymer was replaced by an equivalent amount of polyisoprene. Vulcanizates were prepared from the filled compositions using procedures described previously, and results of physical testing on those filled compositions and vulcanizates are summarized in the following table.

TABLE 10

Compound & vulcanizate properties,
aluminum acrylate (carbon black compound)

|  | 46 | 47 | 48 |
|---|---|---|---|
| synthetic polybutadiene (sample no.) | 43 | 44 | 45 |
| $ML_{1+4}$ @ 130° C. (final) | 74.3 | 57.9 | 76.4 |
| Ring Tensile @ 23° C. (final, unaged) | | | |
| $M_{100}$ (MPa) | 2.41 | 2.30 | 2.18 |
| $T_b$ (MPa) | 17.57 | 17.64 | 18.28 |
| $E_b$ (%) | 456 | 475 | 503 |
| Ring Tensile @ 100° C. (final, unaged) | | | |
| $M_{100}$ (MPa) | 2.22 | 2.11 | 2.00 |
| $T_b$ (MPa) | 10.00 | 10.40 | 10.73 |
| $E_b$ (%) | 358 | 383 | 415 |
| Strain sweep (50° C., 15 Hz, 3% strain) | | | |
| G' (MPa) | 3.99 | 3.44 | 3.58 |
| ΔG' (MPa) | 3.41 | 2.68 | 2.81 |
| tan δ | 0.1228 | 0.1218 | 0.1193 |

That which is claimed is:

1. A terminally functionalized polymer provided by a process comprising reacting a terminally active polymer that comprises polyene mer with an α,β-ethylenically unsaturated compound having the general formula

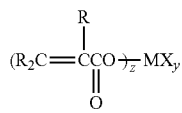

where each R independently is a hydrogen atom or $C_1$-$C_{10}$ alkyl group, M is a group 2-13 element, y and z are integers with the provisos that z is not zero and y+z is equal to a valence of M, and each X independently is $R^1$, $OR^1$, $OC(O)R^1$, $C(O)OR^1$ or $NR^1_2$ in which each $R^1$ independently is a $C_1$-$C_{30}$ alkyl group, thereby providing said terminal functionality to said polymer.

2. The polymer of claim 1 wherein said terminally active polymer comprises polydiene mer.

3. The polymer of claim 2 wherein said terminally active polymer is provided in the presence of a lanthanide-based catalyst.

4. The polymer of claim 1 wherein said terminally active polymer further comprises vinyl aromatic mer.

5. The polymer of claim 4 wherein said terminally active polymer is provided in the presence of an anionic initiator.

6. The polymer of claim 1 wherein z is 1 and wherein M is B and y is 2, M is Al and y is 2, or M is Zn and y is 1.

7. The polymer of claim 1 wherein said α,β-ethylenically unsaturated compound has the general formula

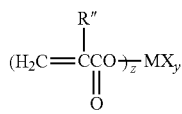

where R″ is a hydrogen atom or $C_1$-$C_3$ alkyl group, M is a group 2-13 element, y and z are integers with the provisos that z is not zero and y+z is equal to a valence of M, and each X independently is $R^1$, $OC(O)R^1$, $C(O)OR^1$ or $NR^1_2$ in which each $R^1$ independently is a $C_1$-$C_{30}$ alkyl group.

8. The polymer of claim 1 wherein said α,β-ethylenically unsaturated compound has the general formula

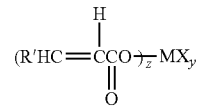

where R′ is a $C_1$-$C_{10}$ alkyl group, M is a group 2-13 element, y and z are integers with the provisos that z is not zero and y+z is equal to a valence of M, and each X independently is $R^1$, $OR^1$, $OC(O)R^1$, $C(O)OR^1$ or $NR^1_2$ in which each $R^1$ independently is a $C_1$-$C_{30}$ alkyl group.

9. The polymer of claim 1 wherein said α,β-ethylenically unsaturated compound has the general formula

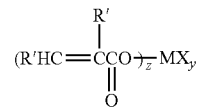

where each R′ independently is a $C_1$-$C_{10}$ alkyl group, M is a group 2-13 element, y and z are integers with the provisos that z is not zero and y+z is equal to a valence of M, and each X independently is $R^1$, $OR^1$, $OC(O)R^1$, $C(O)OR^1$ or $NR^1_2$ in which each $R^1$ independently is a $C_1$-$C_{30}$ alkyl group.

10. The polymer of claim 7 wherein z is 1 and wherein M is B and y is 2, M is Al and y is 2, or M is Zn and y is 1.

* * * * *